(12) United States Patent
Yanagi (10) Patent No.: US 6,625,173 B1
(45) Date of Patent: Sep. 23, 2003

(54) BASE STATION TRANSMITTER FOR CDMA SYSTEM AND SERIAL SIGNAL TRANSMITTING METHOD THEREFOR

(75) Inventor: Shuzo Yanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/376,360

(22) Filed: Aug. 18, 1999

(30) Foreign Application Priority Data

Aug. 19, 1998 (JP) .......................................... 10-233171

(51) Int. Cl.[7] .............................................. H04J 13/00
(52) U.S. Cl. ...................... 370/479; 370/335; 370/498; 370/535
(58) Field of Search ................................ 370/479, 294, 370/320, 321, 342, 347, 441, 442, 503, 318, 536, 537, 542, 328, 329, 335–337, 345, 465, 466, 498; 375/130; 455/422

(56) References Cited

U.S. PATENT DOCUMENTS

| 4,740,962 | A | * | 4/1988 | Kish, III ...................... 370/514 |
| 6,011,785 | A | * | 1/2000 | Carney et al. ............... 370/330 |
| 6,097,711 | A | * | 8/2000 | Okawa et al. ............... 370/335 |
| 6,178,158 | B1 | * | 1/2001 | Suzuki et al. ............... 370/203 |
| 6,430,421 | B1 | * | 8/2002 | Kiiski et al. ............. 455/277.1 |

| 2002/0012362 | A1 | * | 1/2002 | Yakata et al. ............... 370/503 |

FOREIGN PATENT DOCUMENTS

| JP | 4-502841 | 5/1992 |
| JP | 8-223113 | 8/1996 |
| JP | 10-22975 | 1/1998 |
| JP | 10-22977 | 1/1998 |

* cited by examiner

Primary Examiner—Kenneth Vanderpuye
Assistant Examiner—Brian Nguyen
(74) Attorney, Agent, or Firm—Sughrue Mion, PLLC (57) ABSTRACT

A base station transmitter for a CDMA system which can quickly reflect an amplitude controlling signal from a mobile station in transmission power control of the base station. The transmitter has a plurality of channel signal processing units which are provided for each communication channel and each of which converts an amplitude signal and a transmission signal into a serial signal. The transmission signal represents information to be transmitted and the amplitude signal is a signal for directing whether an amplitude of the transmission signal is increased or decreased. In the serial signal, one or more dummy bits are inserted between the transmission signal and the amplitude signal. The serial signal is then separated into the transmission signal and the amplitude signal. Each of the separated transmission signals is spread modulated with a corresponding spread code, and the spread modulated signals are combined into a combined spread signal on the basis of respective amplitude signals.

13 Claims, 12 Drawing Sheets

BASE STATION TRANSMITTER FOR CDMA SYSTEM AND SERIAL SIGNAL TRANSMITTING METHOD THEREFOR

BACKGROUND OF THE INVENTION

1. Field of the Invention

The present invention relates to a base station transmitter employing a CDMA (Code Division Multiple Access) scheme as a multiple access scheme, and more particularly to a power controlling method for transmission signals in a plurality of communication channels in the base station transmitter.

2. Description of the Prior Art

In a communication system with the CDMA, data to be transmitted is spectrum-spread modulated using a spread code (i.e., a pseudorandom noise (PN) sequence) in a transmitter and the spread modulated data is transmitted to a receiving side. In a receiver, the received data is demodulated by despreading the received data using the same spread code as the spread code used in the transmitter. In the CDMA communication system, since each communication channel is specified by selecting the spread code for use in despreading on the receiving side, a plurality of communication channels can be established in the same frequency band by a plurality of transmitting sides using different spread codes orthogonal to one another for spreading.

However, since it is difficult to completely maintain orthogonality between all of used spread codes, actually the respective spread codes are not completely orthogonal to one another but have components correlated with the other codes. These correlated components act as interference components for their own communication to contribute to deteriorated communication quality. Since such a factor causes interference components, the interference components are increased as the number of communication channels is increased. Thus, in the CDMA communication system, Eb/Io (ratio of desired received wave power to interference wave power) can be most effectively ensured when all of a plurality of signals to be received in a receiver has the same power. Therefore, the CDMA communication system must control transmission power on each transmitting side.

A base station in the CDMA communication system controls transmission power of each mobile station such that the reception power at the base station from each mobile station is equal to one another.

Additionally, a base station spread modulates transmission signals destined for each mobile station and then combines the spread modulated signals into a combined spread signal which is then transmitted to each mobile station. When a base station combines the plurality of signals, it controls the amplitudes of transmission signals destined for each mobile station in accordance with an amplitude controlling signal included in an upward channel from each mobile station, as opposed to the power control as described above.

To control the amplitudes of a plurality of signals and combine them in this manner, a conventional CDMA base station transmitter changes the amplitudes of spread modulated transmission signals with a variable gain amplifier or the like, and then combines the respective transmission signals. However, according to this method, since many variable gain amplifiers are required as communication channels, thereby having a disadvantage that an increased number of communication channels causes an increase in the scale of a circuit of a CDMA base station transmitter. Also, an analog circuit such as a variable gain amplifier requires considerable adjustment, maintenance, or the like, which involves time and effort. In view of the situation, a CDMA base station transmitter having transmission power controlling function such that an amplitude of each channel is controlled with digital processing without requiring a variable gain amplifier or the like has been employed.

Figure 1:
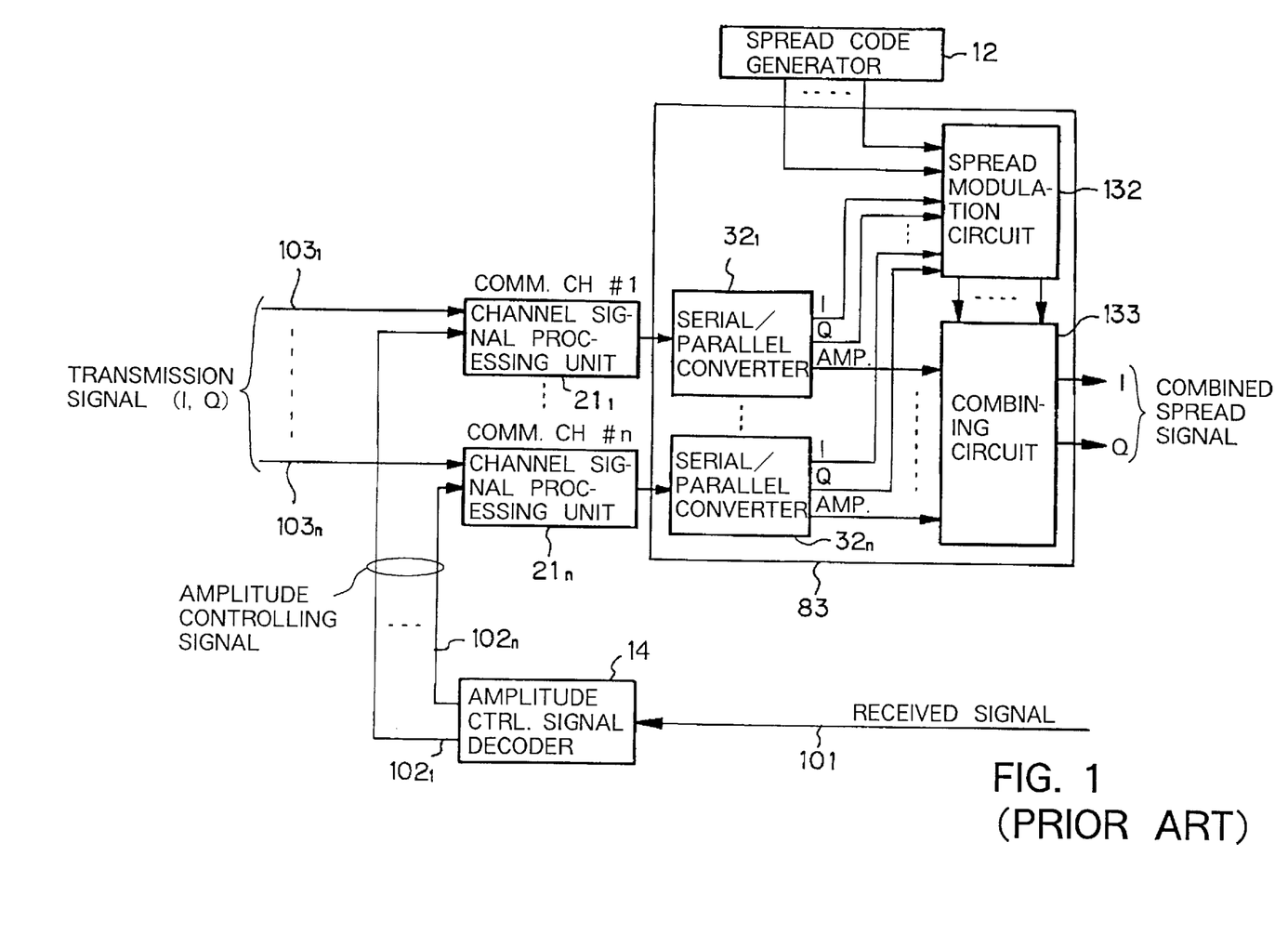
FIG. 1 is a block diagram showing a configuration of a conventional base station transmitter for CDMA.

As a CDMA base station transmitter having such a transmission power controlling function, a base station transmitter as described in Japanese Patent Laid-open Application No. 10-22977 (JP, 10022977, A) has been proposed, for example. FIG. 1 is a block diagram showing a configuration of a conventional CDMA base station transmitter having the transmission power controlling function.

The conventional CDMA base station transmitter shown in FIG. 1 spreads respective transmission signals for n communication channels #1 to #n with different spread codes, and then combines the respective signals into a combined spread signal which is then transmitted to receivers. The CDMA base station transmitter uses orthogonal modulation as a primary modulation before the spread modulation. Each transmission signal can be divided into an in-phase component I and a quadrature component Q. The CDMA base station transmitter, as shown in FIG. 1, has channel signal processing units $21_1$ to $21_n$ provided for respective communication channels, spread code generator 12 for generating spread codes for respective communication channels, spreading and combining unit 83 for performing spread modulation and combination, and amplitude controlling signal decoder 14.

Amplitude controlling signal decoder 14 is supplied with received signal 101 as an input which has been transmitted from each mobile station, and decodes and outputs amplitude controlling signals $102_1$ to $102_n$ for respective communication channels #1 to #n included in received signal 101. Amplitude controlling signals $102_1$ to $102_n$ indicate whether the transmission power of the CDMA base station transmitter is to be increased or to be reduced.

Figure 2:
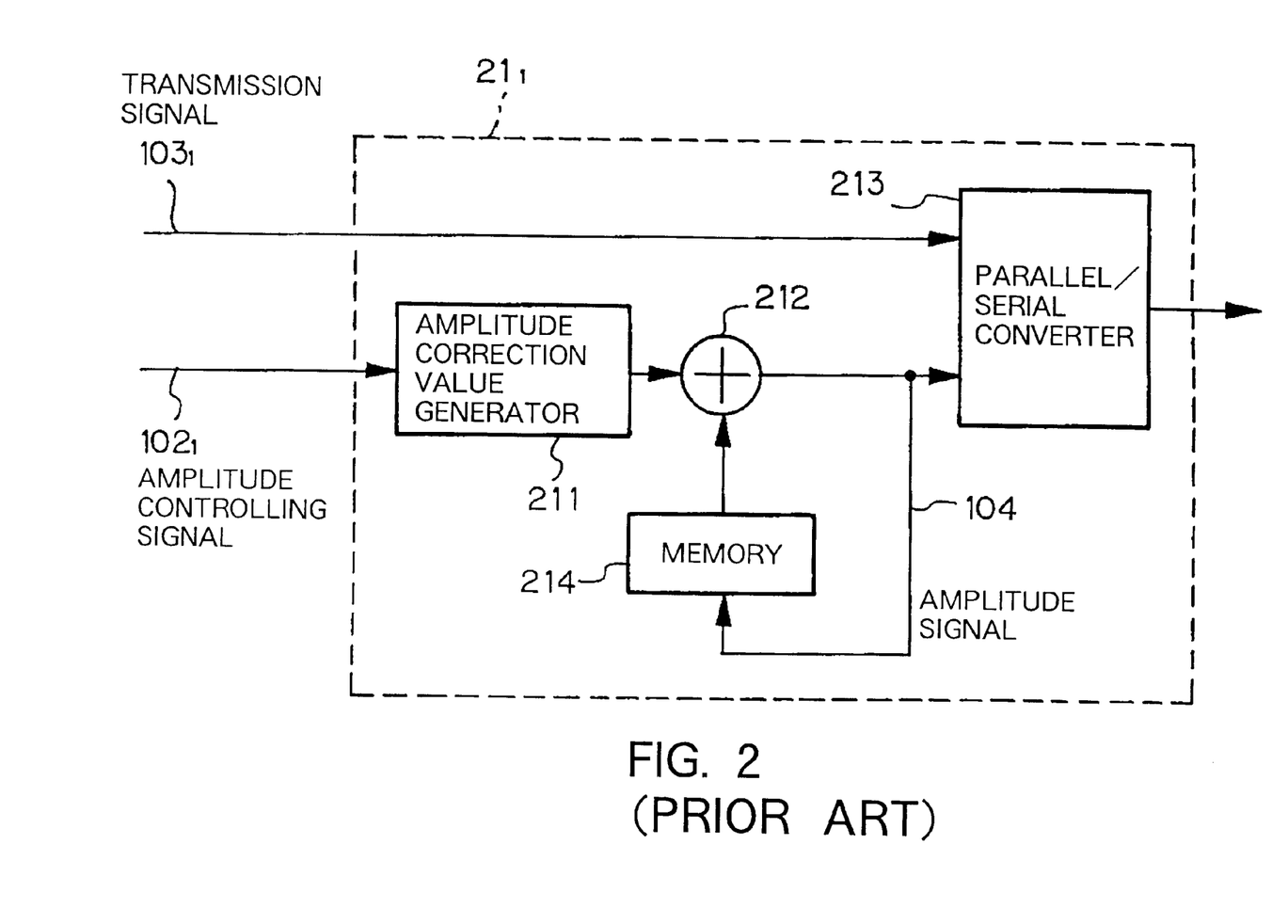
FIG. 2 is a block diagram showing a configuration of a channel signal processing unit in the transmitter shown in FIG. 1.

Channel signal processing unit $21_1$, as shown in FIG. 2, comprises amplitude correction value generator 211, adder 212, memory 214, and parallel-to-serial converter 213. The configurations of channel signal processing units $21_2$ to $21_n$ are the same as that of channel signal processing unit $21_1$. Amplitude correction value generator 211 receives amplitude controlling signal $102_1$ from amplitude controlling signal decoder 14 and calculates a correction value for correcting amplitude signal 104 in accordance with the direction of amplitude controlling signal $102_1$. More specifically, since amplitude controlling signal $102_1$ is provided for directing an increase or decrease in the amplitude of a transmission signal for communication channel #1, amplitude correction value generator 211 generates as a correction value a signal for increasing or decreasing the amplitude signal by a predetermined value in accordance with the direction of amplitude controlling signal 102. For example, when amplitude controlling signal $102_1$ directs an increase, a signal "+1.0 dB" is generated, while a signal "−1.0 dB" is generated when amplitude controlling signal $102_1$ directs a decrease.

Figure 3:
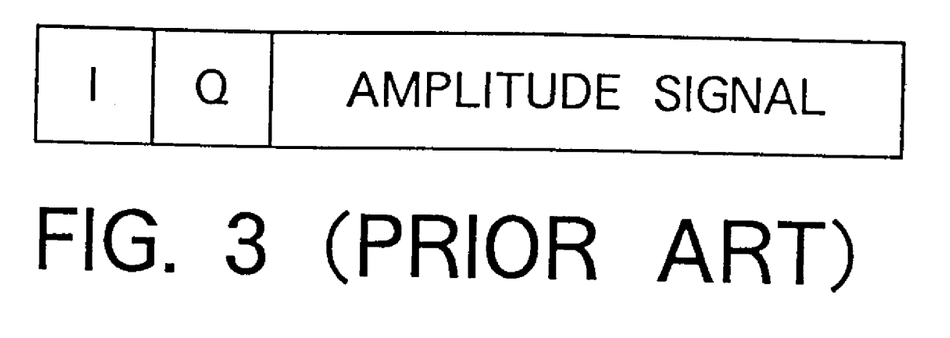
FIG. 3 is a diagram showing a format of a channel signal used in the transmitter shown in FIG. 1.

Adder 212 adds the correction value calculated at amplitude correction value generator 211 to amplitude signal 104 before correction stored in memory 214 to provide the result as amplitude signal 104 after correction. Memory 214 temporarily stores amplitude signal 104 provided from adder 212 and provides the signal to adder 212 after holding the signal for a predetermined time period. Parallel-to-serial converter 213 converts amplitude signal 104 provided from adder 212 and transmission signal $103_1$ into one serial signal and outputs the signal. The format of the serial signal is shown in FIG. 3.

The processing with channel signal processing unit $21_1$ shown in FIG. 2 may be also realized with a DSP (Digital Signal Processor) using software.

Spreading and combining unit 83 comprises serial-to-parallel converters $32_1$ to $32_n$ for receiving the serial signals from the channel signal processing units, spread modulation circuit 132 for performing spread modulation, and combining circuit 133 for generating a combined spread signal. In spreading and combining unit 83, each of the serial signals from respective channel signal processing units $21_1$ to $21_n$ is applied to each of serial-to-parallel converters $32_1$ to $32_n$, converted to a parallel signal, and separated into a transmission signal (I component and Q component) and an amplitude signal. The transmission signal separated from the serial signal with each of serial-to-parallel converters $32_1$ to $32_n$ is spread modulated at spread modulation circuit 132 with a spread code generated at spread code generator 12 to be outputted as a spread modulated signal. On the other hand, the amplitude signal separated from the serial signal with each of serial-to-parallel converters $32_1$ to $32_n$ is applied to combining circuit 133 for each of communication channels #1 to #n. Combining circuit 133 converts the spread modulated signal generated by spread modulation circuit 132 into a signal with an amplitude value indicated by the amplitude signal and then combines respective signals to generate a combined spread signal.

In this manner, the conventional CDMA base station transmitter shown in FIG. 1 is configured such that an amplitude signal indicating an amplitude value of a transmission signal is generated besides the transmission signal, and these signals are supplied as a serial signal to spreading and combining unit 83. In spreading and combining unit 83, signals each obtained by spread modulating the transmission signal with a spread code are combined using the amplitude values indicated by the amplitude signals.

As described above, amplitude controlling signals $102_1$ to $102_n$ are transmitted from mobile stations through received signal 101 at regular intervals. An example of the format of received signal 101 is shown in FIG. 4.

Figure 4:
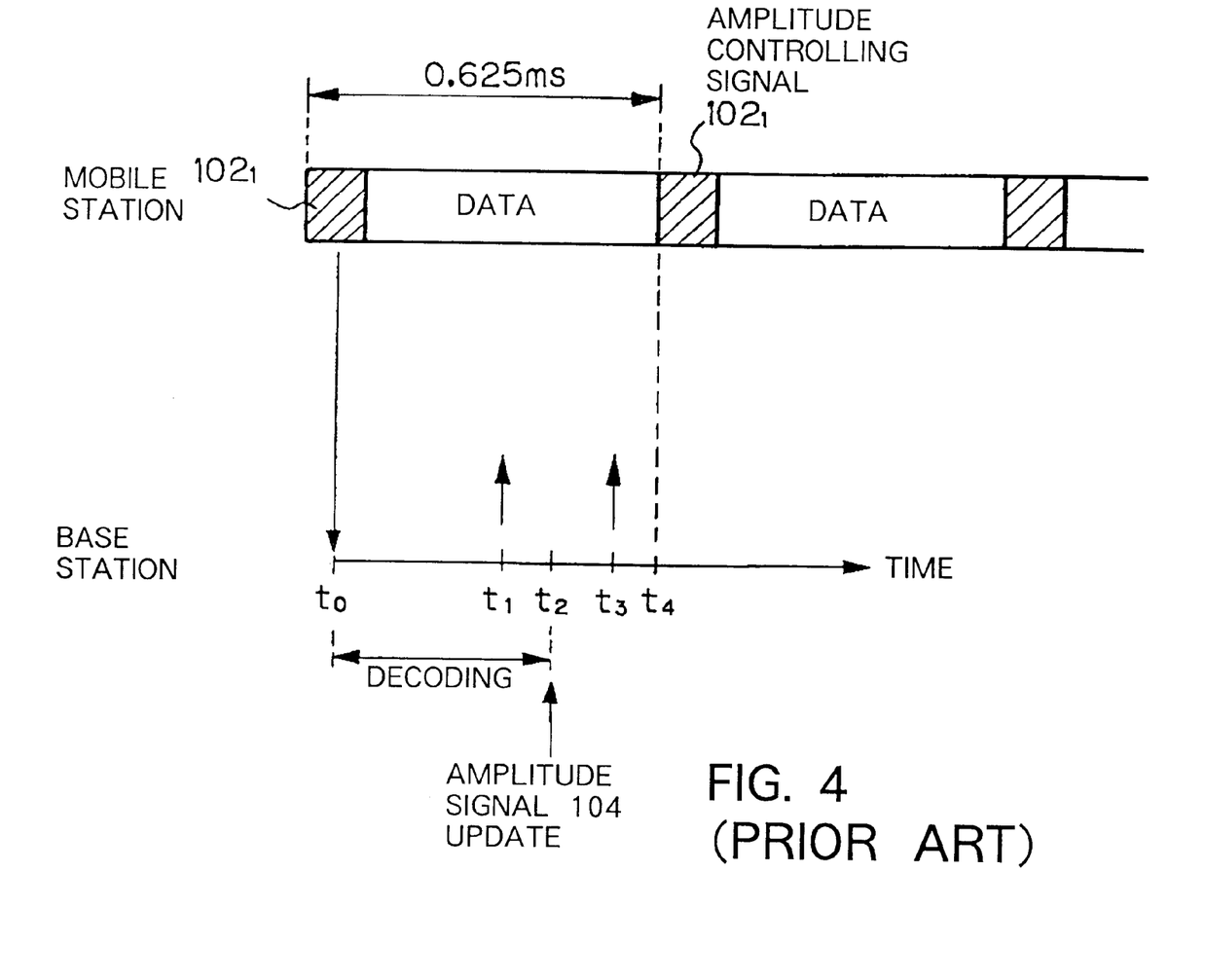
FIG. 4 is a timing chart showing a relationship between a timing of transmission of an amplitude controlling signal in a mobile station and a timing of decoding in a base station.

FIG. 4 is a diagram showing the format of received signal 101 for communication channel #1. Transmission amplitude controlling signal $102_1$ is transmitted at intervals of 0.625 ms.

In the CDMA base station transmitter, since amplitude controlling signal decoder 14 requires a certain time period for decoding amplitude controlling signal $102_1$ from received signal 101, the CDMA base station transmitter requires a certain time period from the reception of received signal 101 to the update of amplitude signal 104 at channel signal processing unit $21_1$. As a result, if the CDMA base station transmitter provides a transmission signal to a mobile station before amplitude signal 104 is updated, the newest amplitude controlling signal $102_1$ is not reflected in the amplitude value of the transmission signal. For example, referring to FIG. 4, when the CDMA base station transmitter receives amplitude controlling signal $102_1$ at time to, the CDMA base station transmitter must send a transmission signal at an amplitude value obtained by reflecting received amplitude controlling signal $102_1$ before time $t_4$ at which a mobile station next transmits amplitude controlling signal $102_1$. Assuming that amplitude signal 104 is updated at time $t_2$ since decoding requires a certain time period, amplitude signal 104 is a value before the update when it is transmitted from channel signal processing unit $21_1$ to spreading and combining unit 83 at time $t_1$. For this reason, amplitude signal 104 must be transmitted to spreading and combining unit 83 between time $t_2$ at which it is updated with a new value and $t_4$.

However, the serial signal transmitted from channel signal processing unit $21_1$ to spreading and combining unit 83 includes the transmission signal (I,Q) and the amplitude signal, as shown in FIG. 3. This causes a disadvantage that a delayed timing of the transmission of the serial signal by channel signal processing unit $21_1$ leads to a delayed timing of the transmission of the transmission signal (I,Q) to spreading and combining unit 83 as well. Since channel signal processing unit $21_1$ can not transmit the serial signal at a substantially delayed timing to avoid the disadvantage, the aforementioned conventional CDMA base station transmitter can not quickly reflect the amplitude controlling signal from a mobile station in the control of the transmission power of the base station. Therefore, the accuracy of control of transmission power is low in the CDMA base station transmitter.

Additionally, in the conventional CDMA base station transmitter, since channel signal processing units $21_1$ to $21_n$ are connected to spreading and combining unit 83 with a one-to-one interface, there exists a disadvantage that an increased number of multiplexed communication channels accordingly increases the number of transmission lines between spreading and combining unit 83 and respective channel signal processing units $21_1$ to $21_n$. In particular, for a CDMA base station transmitter which employs information such as voice at a low bit rate but requiring multiple channels as a transmission signal, an increased number of transmission lines causes an increased scale of a circuit.

SUMMARY OF THE INVENTION

It is an object of the present invention to provide a CDMA base station transmitter which can quickly reflect an amplitude controlling signal from a mobile station in transmission power control of a base station.

It is another object of the present invention to provide a CDMA base station transmitter in which a circuit scale is not increased, even with an increased number of multiplexed communication channels.

To achieve the aforementioned objects, in a CDMA base station transmitter according to the present invention, one or more dummy bits are inserted between a transmission signal and an amplitude signal. The use of the dummy bit in this manner makes it possible to delay a timing of transmission of the amplitude signal for each communication channel to a spreading and combining unit without delaying a timing of transmission of the transmission signal to the spreading and combining unit. As a result, an amplitude controlling signal transmitted from a mobile station can be reflected in the amplitude signal immediately after decoding, thereby enhancing accuracy of control of transmission power of a base station.

The other object of the present invention is achieved by providing channel block time division multiplexing means for performing time division multiplexing of first serial signals from a plurality of channel signal processing means provided for each communication channel into a second serial signal to output the second serial signal, and channel block separating means for separating the second serial signal from the channel block time division multiplexing means into the original first serial signals before the time division multiplexing. Specifically, transmission signals and amplitude signals for respective communication channels are multiplexed in a time division manner into one serial signal, i.e., the second serial signal, which is transmitted to combining means, thereby reducing the number of transmission lines to enable a reduction in the circuit scale.

For a signal format of the second serial signal, a signal format in which a transmission signal for each communication channel precedes and an amplitude signal for each communication channel is arranged following the transmission signal may be employed. The use of such a format makes it possible to delay a timing of transmission of the amplitude signal for each communication channel to a spreading and combining unit without delaying a timing of transmission of the transmission signal to the spreading and combining unit. As a result, an amplitude controlling signal transmitted from a mobile station can be reflected in the amplitude signal immediately after decoding, thereby enhancing accuracy of transmission power control of a base station.

Alternatively, for a signal format of the second serial signal, a signal format in which a transmission signal for each communication channel is first transmitted, one or more dummy bits are transmitted next, and finally an amplitude signal for each communication channel is transmitted may be employed. The use of the dummy bit in this manner makes it possible to delay a timing of transmission of the amplitude signal for each communication channel to a spreading and combining unit without delaying a timing of transmission of the transmission signal to the spreading and combining unit. As a result, an amplitude controlling signal transmitted from a mobile station can be reflected in the amplitude signal immediately after decoding, thereby enhancing accuracy of transmission power control of a base station.

Additionally, in the present invention, a plurality of channel signal time division multiplexers may be provided. Since such a configuration allows a larger number of communication channels to be spread and combined as compared with the case of a single channel signal time division multiplexer, the circuit scale can be substantially reduced by decreasing the number of transmission lines.

The above and other objects, features, and advantages of the present invention will become apparent from the following description referring to the accompanying drawings which illustrate examples of preferred embodiments of the present invention.

DESCRIPTION OF THE PREFERRED EMBODIMENTS

First Embodiment

Figure 5:
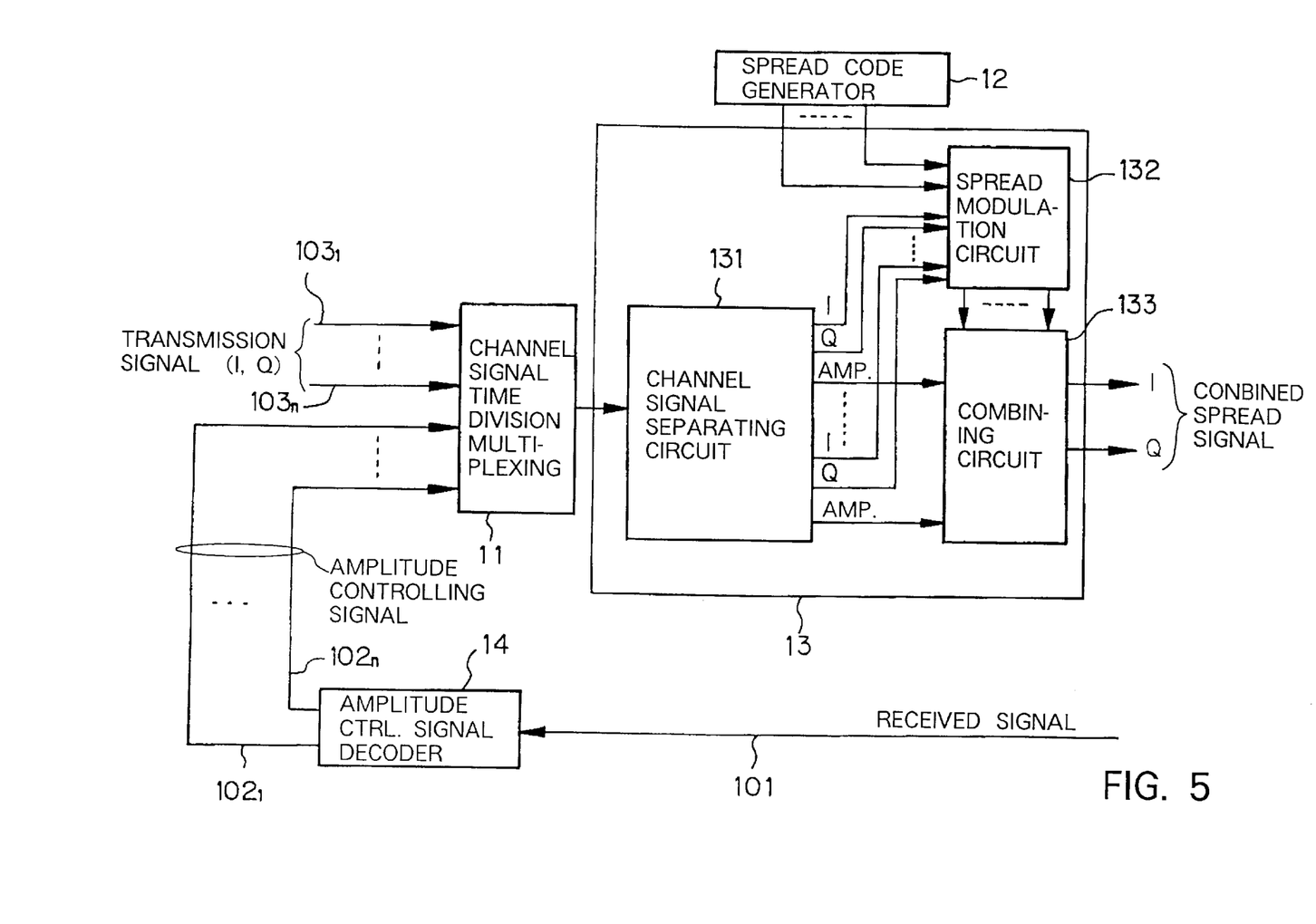
FIG. 5 is a block diagram showing a configuration of a base station transmitter for CDMA according to a first embodiment of the present invention.

FIG. 5 shows a configuration of a CDMA base station transmitter in a first embodiment of the present invention. In FIG. 5, components designated the reference symbols identical to those in FIG. 1 indicate the same functional blocks as those in FIG. 1.

The CDMA base station transmitter shown in FIG. 5 comprises channel signal time division multiplexer 11 for performing time division multiplexing of transmission signals and amplitude signals for respective communication channels into one serial signal, spread code generator 12 for generating a spread code for each communication channel, spreading and combining unit 13 for performing spread modulation and combining the spread signals, and amplitude controlling signal decoder 14 for generating amplitude controlling signals $102_1$ to $102_n$ based on received signal 101.

Figure 6:
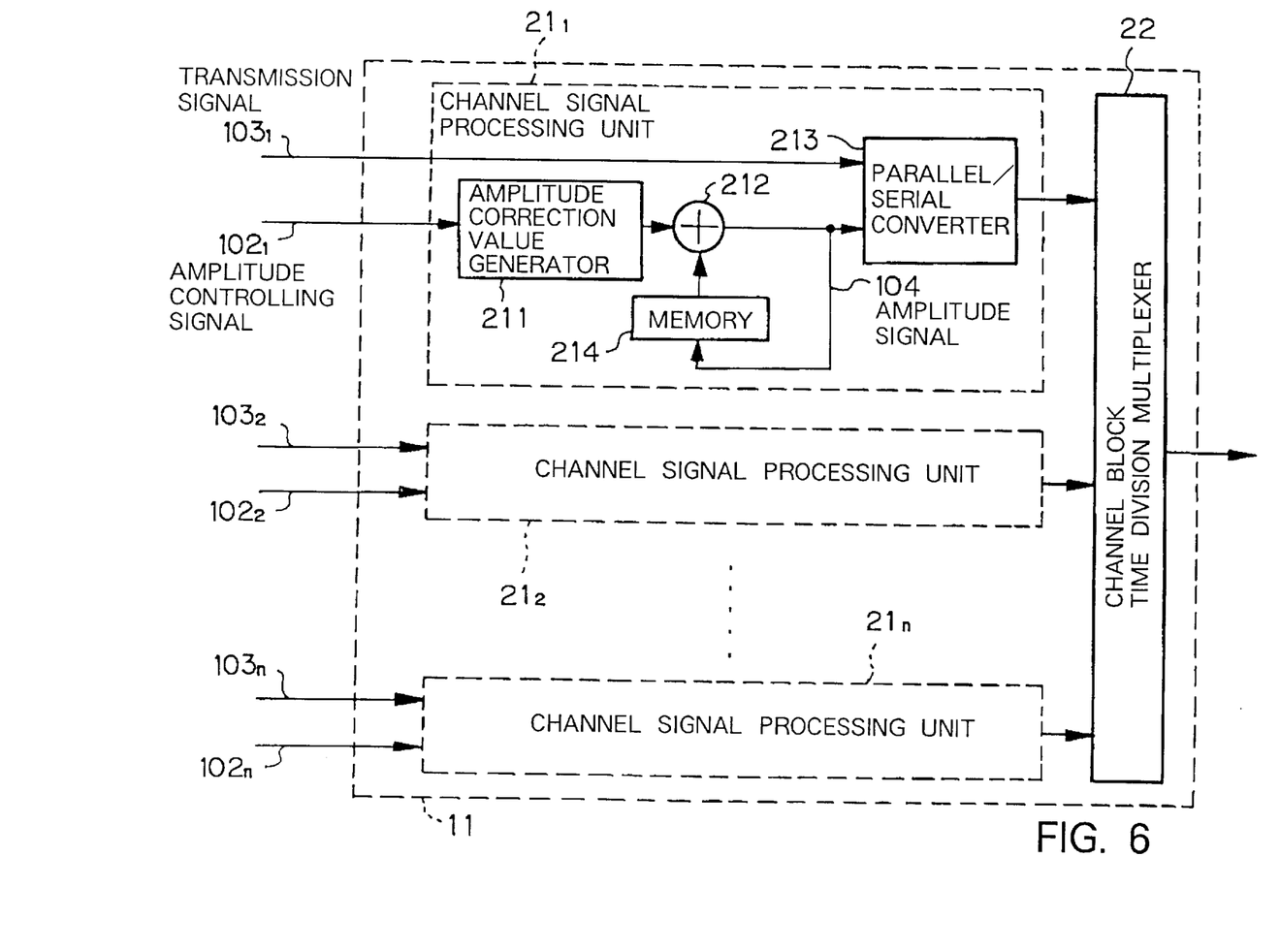
FIG. 6 is a block diagram showing a configuration of a channel signal time division multiplexer in the transmitter shown in FIG. 5.

Channel signal time division multiplexer 11, as shown in FIG. 6, comprises n channel signal processing units $21_1$ to $21_n$ and channel block time division multiplexer 22. Channel block time division multiplexer 22 multiplexes in a time division manner a total of n serial data from respective n channel signal processing units $21_1$ to $21_n$ into single serial data to output the data. Each of channel signal processing units $21_1$ to $21_n$ is provided with amplitude correction value generator 211, adder 212, parallel-to-serial converter 213 and memory 214, similarly to the conventional CDMA base station transmitter shown in FIG. 1.

Figure 7:
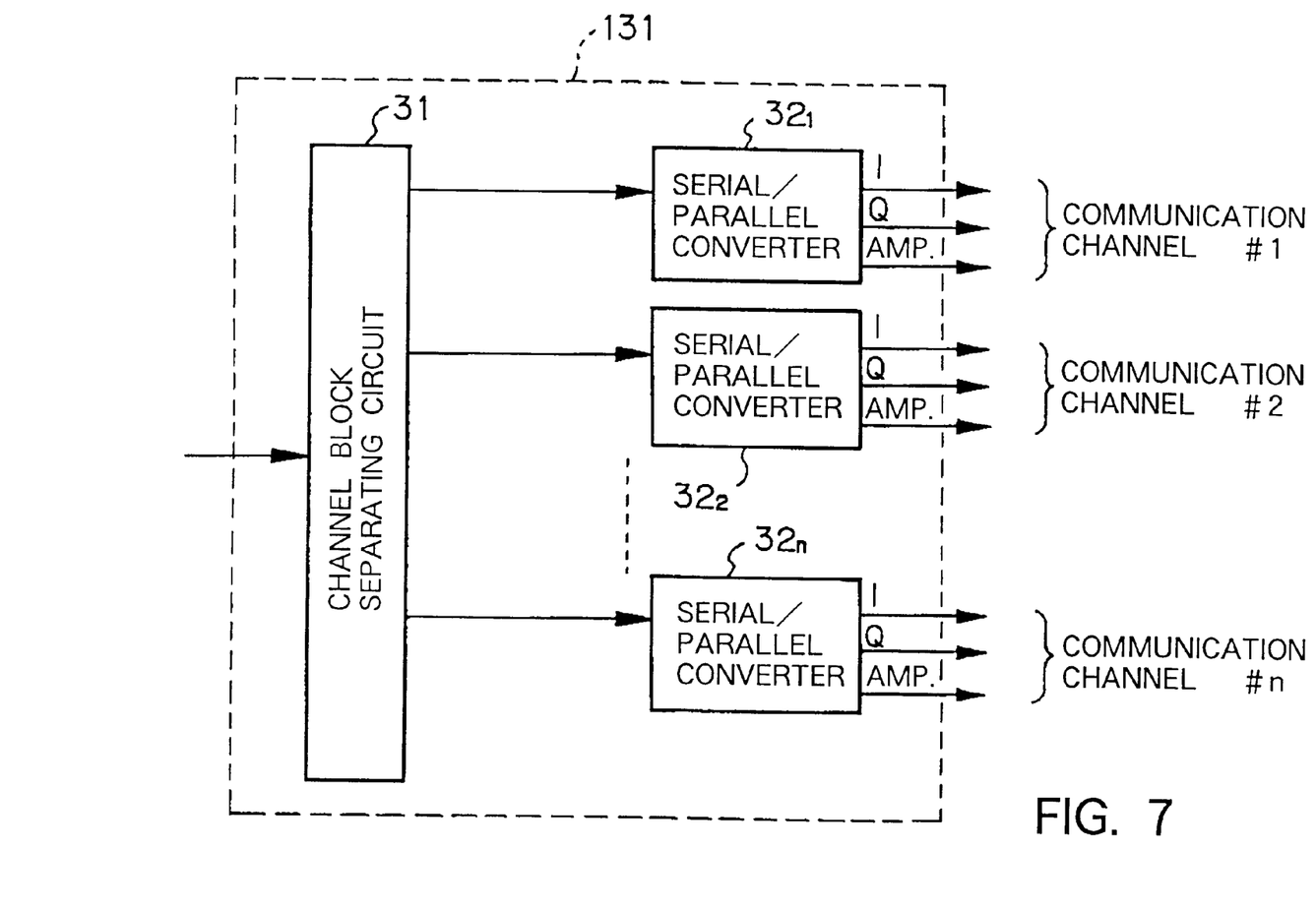
FIG. 7 is a block diagram showing a configuration of a channel signal separating circuit in the transmitter shown in FIG. 5.

Spreading and combining unit 13 has a configuration similar to that of spreading and combining unit 83 of the conventional CDMA base station transmitter shown in FIG. 1 and differs from the conventional one in that channel signal separating circuit 131 is substituted for serial-to-parallel converters $32_1$ to $32_n$ in conventional spreading and combining unit 83. Channel signal separating circuit 131 comprises serial-to-parallel converters $32_1$ to $32_n$ and channel block separating circuit 31 as shown in a block diagram in FIG. 7. Channel block separating circuit 31 divides, i.e., demultiplexes, serial data transmitted from channel signal time division multiplexer 11 into n series of serial data each corresponding to one of communication channels #1 to #n, and provides the divided data to respective serial-to-parallel converters $32_1$ to $32_n$. The divided serial data correspond to the data before the time division multiplexing.

In the CDMA base station transmitter, even when the number of communication channels is increased, a single transmission line may be sufficient for connecting channel signal time division multiplexer 11 and spreading and combining unit 13. Since an increased number of communication channels does not cause an increase in the number of the transmission line, the circuit scale of the CDMA base station transmitter is not increased.

The present embodiment requires channel signal separating circuit 131 in spreading and combining unit 13 for separating the time division multiplexed serial signal into serial signals for respective communication channels. However, the addition of channel signal separating circuit 131 is substantially less than a reduction in the circuit scale resulting from a reduced number of transmission lines.

Figures 8A, 8B:
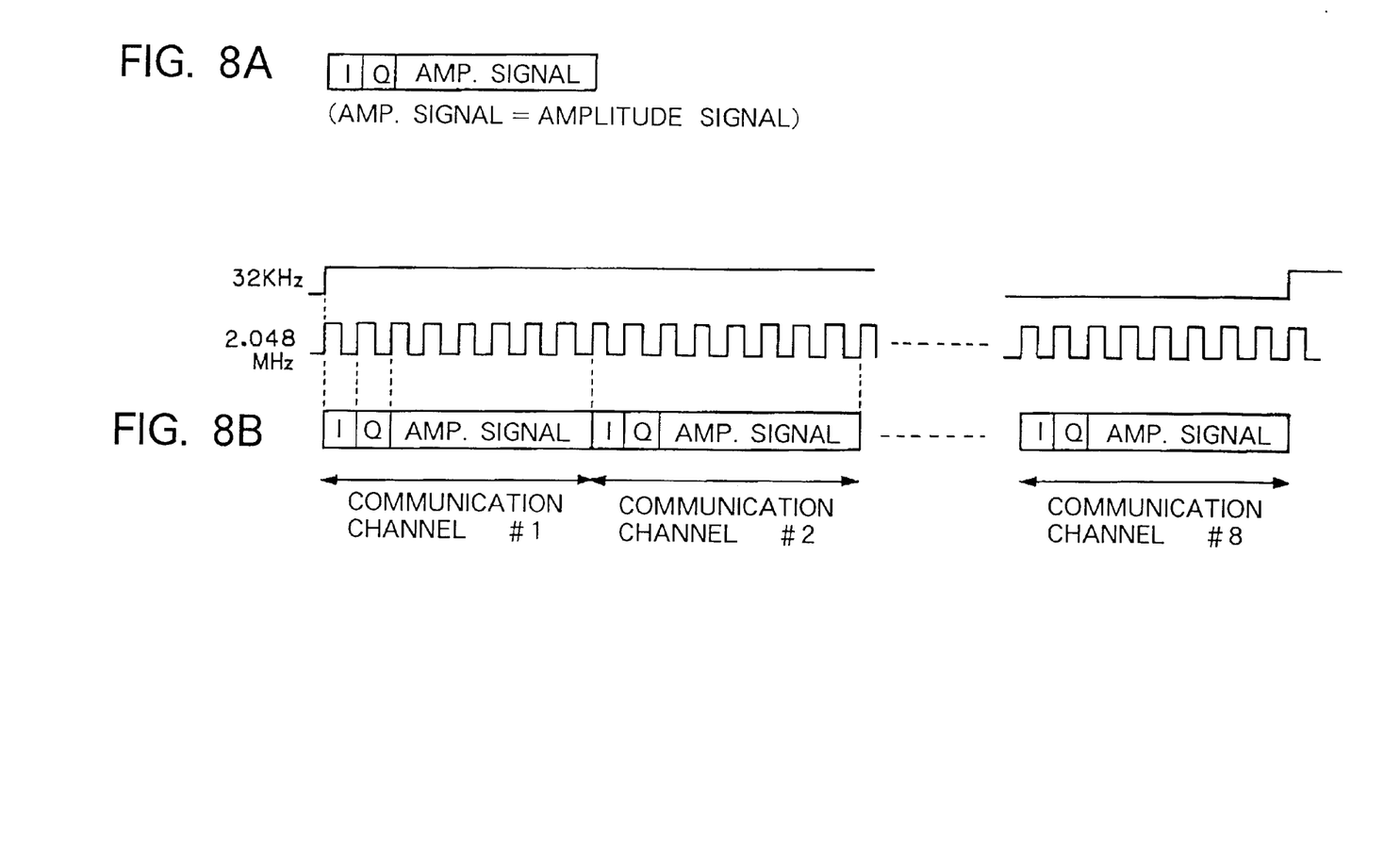
FIG. 8A is a diagram showing a format of a transmission signal per communication channel.
FIG. 8B is a diagram showing a format of a transmission signal which is multiplexed in a time division manner by the channel signal time division multiplexer.

Next, examples of the format of the serial data to be multiplexed at channel signal time division multiplexer 11 are shown in FIG. 8A and 8B.

Shown in FIG. 8A and 8B are examples when a transmission signal comprises an in-phase component I and a quadrature component Q each containing a binary signal having a data rate of 32 kHz, the bit number of an amplitude signal is 6, and the number of communication channels is 8. Description will be hereinafter made using this example.

As shown in FIG. 8A, the format of a serial signal for each communication channel is configured to have one block of a total of 8 bits consisting of the I and Q components each of 1 bit and an amplitude signal of 6 bits. The format of a serial signal obtained with the time division multiplexing for eight communication channels at channel signal time division multiplexer 11 is shown in FIG. 8B. The clock rate of the time division multiplexed serial data is represented as 32 kHz×8 (the number of communication channels)×8 bits= 2.048 MHz. The format of the transmission signal can be realized with a clock rate at a minimum of 2.048 MHz. The clock rate corresponds to a code length of 64 when binary data of 32 kHz is spread modulated, and a circuit corresponding to the clock rate can be easily realized. Therefore, it is easily possible to send transmission signals for eight communication channels in such a format of time division multiplexed signals.

Second Embodiment

Figure 9:
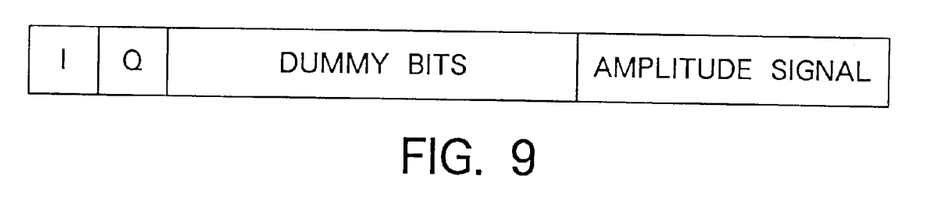
FIG. 9 is a diagram showing a format of a channel signal in a CDMA base station transmitter according to a second embodiment of the present invention.

A CDMA base station transmitter of a second embodiment of the present invention will be hereinafter described. FIG. 9 is a diagram showing a format of the serial signal in the CDMA base station transmitter. The CDMA base station transmitter of the present embodiment has a configuration similar to that of the conventional CDMA base station transmitter shown in FIG. 1 and differs from the conventional transmitter only in that a format of serial signals transmitted from channel signal processing units $21_1$ to $21_n$ is such a format as shown in FIG. 9.

In the second embodiment, as shown in FIG. 9, the serial signal is a signal in which one or more dummy bits are inserted between a transmission signal (I,Q) of two bits and an amplitude signal. This makes it possible to delay a timing of transmission of an amplitude signal to a spreading and combining unit without delaying a timing of transmission of the transmission signal (I,Q) to the spreading and combining unit. The amplitude signal for each communication channel is transmitted to the spreading and combining unit after decoding is completed at amplitude controlling signal decoder 14. The value of an amplitude signal to be transmitted to the spreading and combining unit is a value updated on the basis of the newest amplitude controlling signal. As a result, it is possible to quickly reflect an amplitude controlling signal from a mobile station in control of transmission power of a base station, thereby enhancing accuracy of transmission power control of a base station.

Third Embodiment

Figure 10:
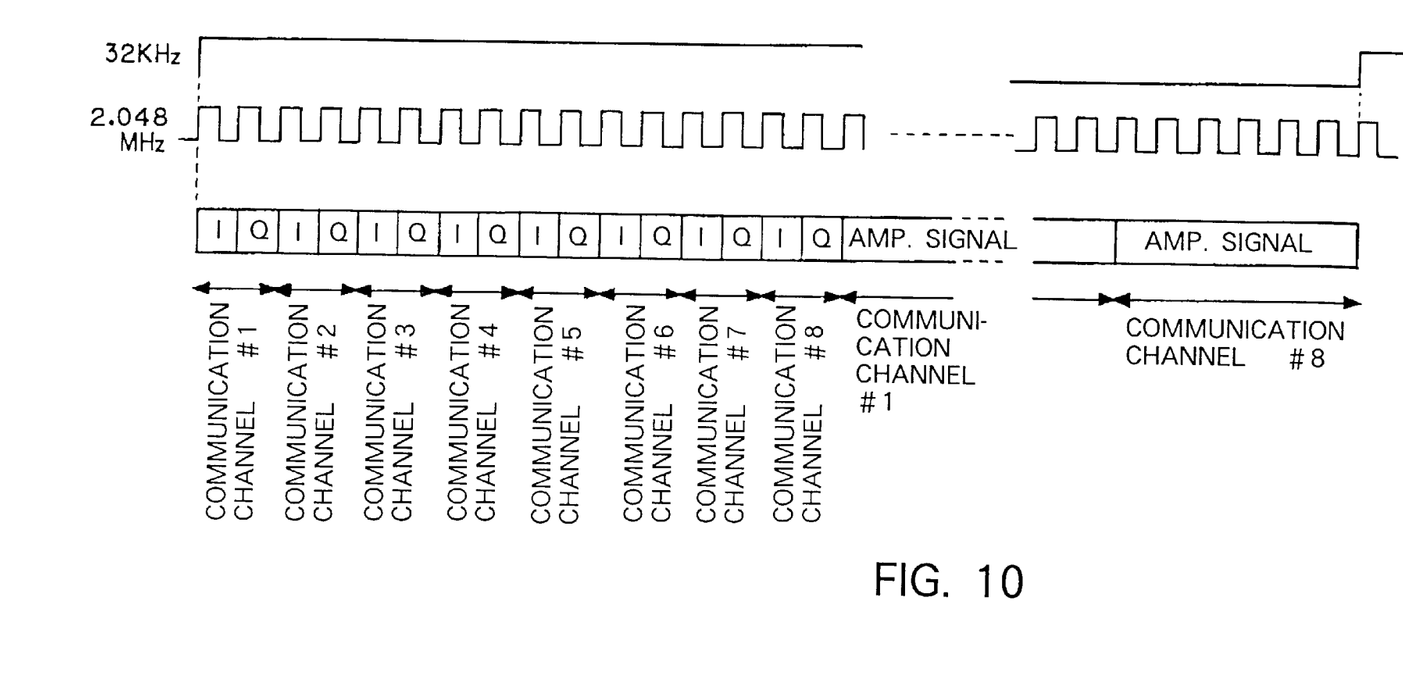
FIG. 10 is a diagram showing a format of a multiplexed channel signal which is time multiplexed in a time division manner by a channel signal time division multiplexer in a CDMA base station transmitter according to a third embodiment of the present invention.

A CDMA base station transmitter of a third embodiment of the present invention will be described. FIG. 10 is a diagram showing a format of the serial signal in the CDMA base station transmitter. The CDMA base station transmitter of the embodiment has a configuration similar to that of the CDMA base station transmitter of the first embodiment shown in FIG. 5, and differs from the transmitter of the first embodiment only in that a format of a serial signal to be multiplexed at channel signal time division multiplexer 11 is such a format as shown in FIG. 10.

The format shown in FIG. 10, unlike the format in the first embodiment shown in FIG. 8A and 8B, is configured such that transmission signals for respective communication channels are first transmitted and then amplitude signals for respective communication channels are transmitted for eight communication channels. In this case, as a number of a communication channel is greater, a timing of transmission of an amplitude signal in each communication channel is set at a later point as compared with the format in FIG. 8A and 8B. This means that an amplitude signal for each communication channel is transmitted to spreading and combining unit 13 after decoding is completed at amplitude controlling signal decoder 14. The value of an amplitude signal to be transmitted to spreading and combining unit 13 is a value updated on the basis of the newest amplitude controlling signal. As a result, it is possible to quickly reflect an amplitude controlling signal from a mobile station in transmission power control of a base station, thereby enhancing accuracy of transmission power control of a base station.

Fourth Embodiment

Figure 11:
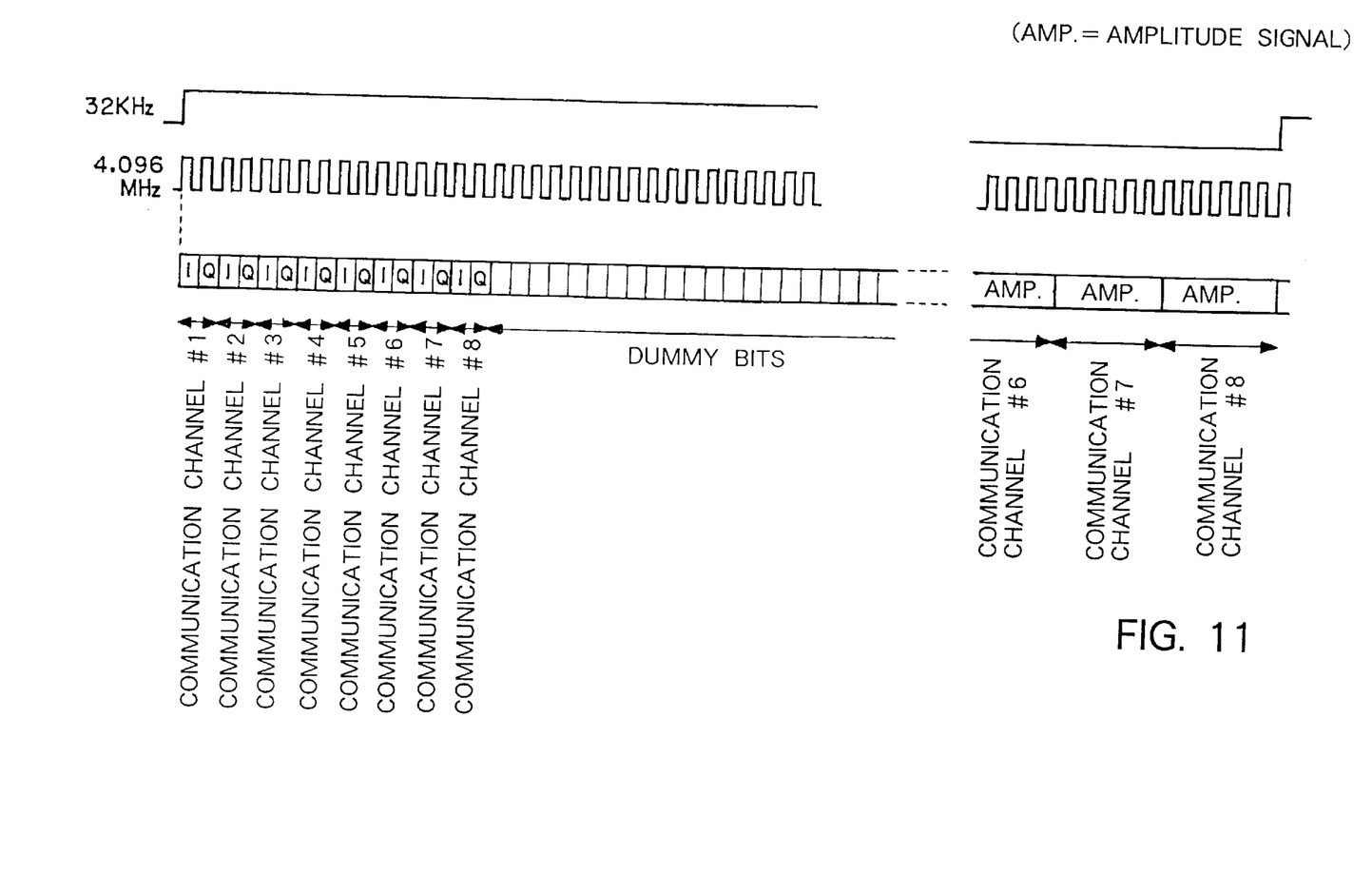
FIG. 11 a diagram showing a format of a multiplexed channel signal which is multiplexed in a time division manner by a channel signal time division multiplexer in a CDMA base station transmitter according to a fourth embodiment of the present invention.

A CDMA base station transmitter of a fourth embodiment of the present invention will be described. FIG. 11 is a diagram showing a format of the serial signal in the CDMA base station transmitter. The CDMA base station transmitter of the present embodiment has a configuration similar to that of the transmitter of the first embodiment shown in FIG. 5, and differs from the transmitter of the first embodiment only in that a format of a serial signal to be time division multiplexed at channel signal time division multiplexer 11 is such a format as in FIG. 11.

The signal format shown in FIG. 11, unlike the signal format of the third embodiment shown in FIG. 10, is configured such that transmission signals for respective communication channels are first transmitted, one or more dummy bits are transmitted next, and finally amplitude signals for respective communication channels are transmitted for eight communication channel signals. Such a signal format causes further delay of a timing of transmission of an amplitude signal for each communication channel to spreading and combining unit 13 as compared with the timing in the third embodiment. As a result, it is possible to quickly reflect an amplitude controlling signal from a mobile station in transmission power control of a base station, thereby enhancing accuracy of transmission power control of a base station.

Fifth Embodiment

Figure 12:
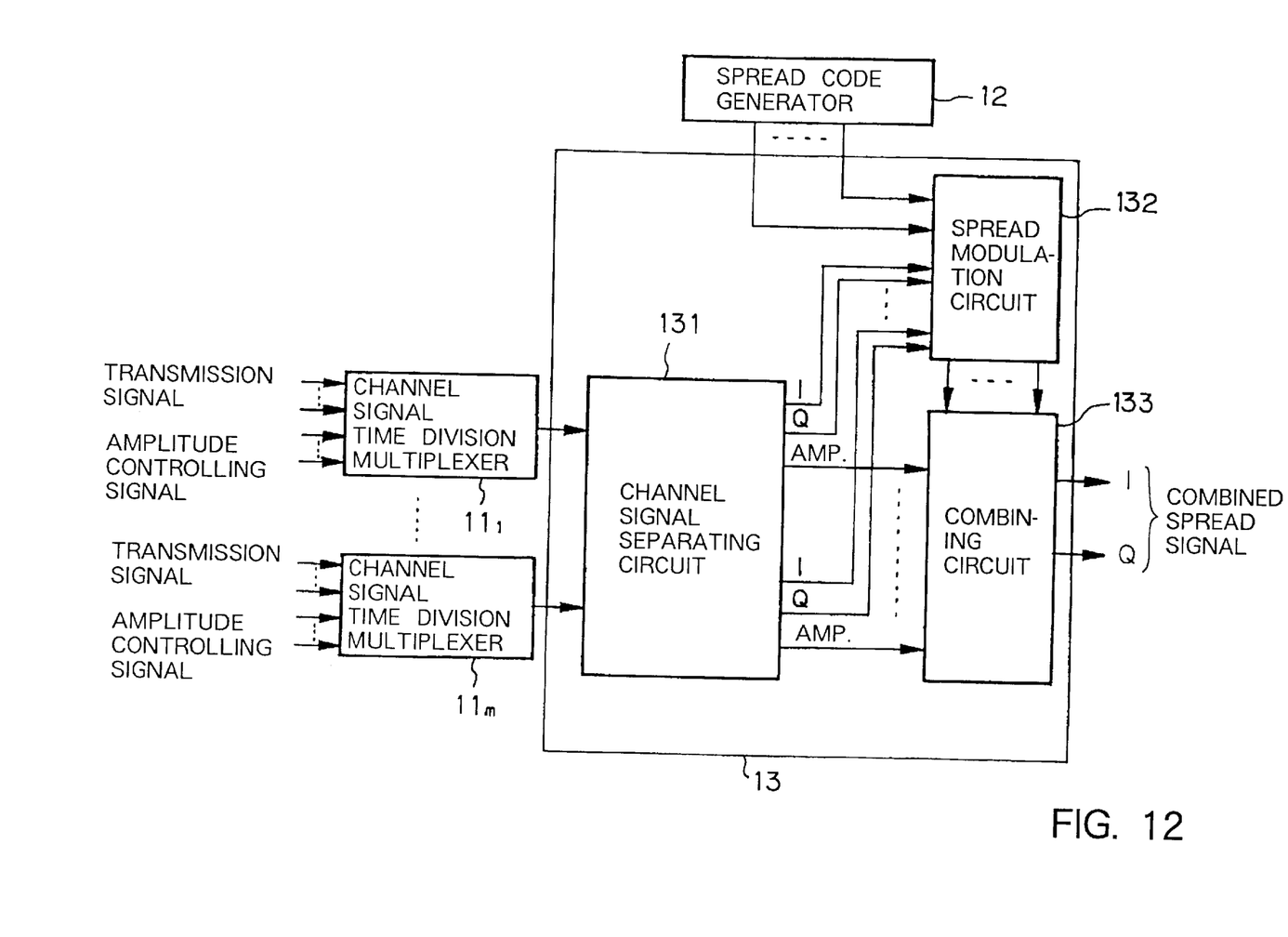
FIG. 12 is a block diagram showing a configuration of a CDMA base station transmitter according to a fifth embodiment of the present invention.

The CDMA base station transmitter of the fifth embodiment shown in FIG. 12 includes m channel signal time division multiplexers $11_1$ to $11_m$ each having a configuration similar to that of channel signal time division multiplexer 11 in the CDMA base station transmitter of the first embodiment shown in FIG. 5. Each of channel signal time division multiplexers $11_1$ to $11_m$ internally multiplexes in a time division manner n communication channels to provide the multiplexed channels to spreading and combining unit 13. Therefore, the number of communication channels to be spread and combined in the embodiment is equal to n×m, which means that the CDMA base station transmitter can spread and combine communication channels m times as many as the CDMA base station transmitter of the first embodiment. The use of the CDMA base station transmitter in spreading and combining multiple communication channels of n×m can substantially reduce the circuit scale as compared with a case where spreading and combining is performed by a conventional CDMA base station transmitter.

It is to be understood that variations and modifications of the CDMA base station transmitter disclosed herein will be evident to those skilled in the art. It is intended that all such modifications and variations be included within the scope of the appended claims.

What is claimed is:

1. A CDMA base station transmitter comprising:
   a plurality of channel signal processing means provided for each communication channel, each of said means for converting an amplitude signal and a transmission signal into a serial signal to output the serial signal, the amplitude signal being generated on a basis of an amplitude controlling signal included in a received signal from a mobile station and directing whether an amplitude of a signal to be transmitted from a base station is increased or decreased, and the transmission signal representing information to be transmitted to the mobile station, and each of said means inserting a dummy bit between the transmission signal and the amplitude signal in generating the serial signal;
   serial-to-parallel converting means for separating the serial signal from each of said channel signal processing means into the transmission signal and the amplitude signal;
   spread modulating means for spread modulating each of the transmission signals supplied from the serial-to-parallel converting means with a corresponding spread code; and
   combining means for changing the signals spread modulated at said spread modulating means to have amplitudes indicated by the respective amplitude signals and then combining the changed signals into a combined spread signal.

2. The transmitter according to claim 1, wherein each of said channel signal processing means includes:
   amplitude correction value generating means for calculating a correction value for correcting the amplitude signal in accordance with the direction of the amplitude controlling signal;
   adding means for adding the correction value calculated at said amplitude correction value generating means and an amplitude signal before correction to output calculated result as an amplitude signal after correction;
   storage means for temporarily storing the amplitude signal after correction outputted from said adding means, holding the amplitude signal after correction for a certain time period, and then outputting the held signal as the amplitude signal before correction to said adding means; and
   parallel-to-serial converting means for converting the amplitude signal after correction supplied from said adding means and the transmission signal into one serial signal to output the serial signal.

3. The transmitter according to claim 1, wherein the transmission signal includes an in-phase component (I) and a quadrature component (Q), each of which is a binary signal.

4. A CDMA base station transmitter comprising:
   a channel signal time division multiplexer including a plurality of channel signal processing means provided for each communication channel, each of said means for converting an amplitude signal and a transmission signal into a first serial signal to output the first serial signal, the amplitude signal being generated on a basis of an amplitude controlling signal included in a received signal from a mobile station and directing whether an amplitude of a signal to be transmitted from a base station is increased or decreased, and the transmission signal representing information to be transmitted to the mobile station, and time division multiplexing means for performing time division multiplexing of the first serial signals from said respective channel signal processing means into a second serial signal to output the second serial signal; and
   a spreading and combining unit including channel block separating means for separating the second serial signal from each of said channel signal processing means into the transmission signal and the amplitude signal, spread modulating means for spread modulating each of the transmission signals from the serial-to-parallel converting means with a corresponding spread code, and combining means for changing the signals spread modulated at said spread modulating means to have amplitudes indicated by the respective amplitude signals and then combining the changed signals into a combined spread signal,
   wherein a signal format of the second serial signal is such that a transmission signal for each communication channel precedes and an amplitude signal for each communication channel is arranged following the transmission signal.

5. The transmitter according to claim 4, wherein a plurality of said channel signal time division multiplexers are provided.

6. The transmitter according to claim 4, wherein said channel signal processing means includes:
   amplitude correction value generating means for calculating a correction value for correcting the amplitude signal in accordance with the direction of the amplitude controlling signal;
   adding means for adding the correction value calculated at said amplitude correction value generating means and an amplitude signal before correction to output calculated result as an amplitude signal after the correction;
   storage means for temporarily storing the amplitude signal after correction outputted from said adding means, holding the amplitude signal after correction for a certain period, and then outputting the held signal as the amplitude signal before correction to said adding means;
   parallel-to-serial converting means for converting the amplitude signal after correction outputted from said adding means and the transmission signal into the first serial signal to output the first serial signal.

7. The transmitter according claim 4, wherein the transmission signal includes an in-phase component (I) and a quadrature component (Q), each of which is a binary signal.

8. A CDMA base station transmitter comprising:
a channel signal time division multiplexer including a plurality of channel signal processing means provided for each communication channel, each of said means for converting an amplitude signal and transmission signal into a first serial signal to output the first serial signal, the amplitude signal being from a mobile station and directing whether an amplitude of a signal to be transmitted from a base station is increased or decreased, and the transmission signal representing information to be transmitted to the mobile station, and time division multiplexing means for performing time division multiplexing of the first serial signals from said respective channel signal processing means into a second serial signal to output the second serial signal; and
a spreading and combining unit including channel block separating means for separating the second serial signal from said time division multiplexing means into the first serial signals, serial-to-parallel converting means for separating the first serial signal from each of said channel signal processing means into the transmission signal and the amplitude signal, spread modulating means for spread modulating each of the transmission signals from the serial-to-parallel converting means with a corresponding spread code, and combining means for changing the signals spread modulated at said spread modulating means to have amplitudes indicated by the respective amplitude signals, and then combining the changed signals into a combined spread signal,
wherein a signal format of the second serial signal is such that a transmission signal for each communication channel is first transmitted, a dummy bit is transmitted next, and finally an amplitude signal for each communication channel is transmitted.

9. A method for transmitting a serial signal in a CDMA base station transmitter, comprising
converting amplitude signals and transmission signals into a plurality of serial signals for respective communication channels, the amplitude signal being generated on a basis of an amplitude controlling signal included in a received signal from a mobile station and directing whether an amplitude of a signal to be transmitted from a base station is increased or decreased, and the transmission signal representing information to be transmitted to the mobile station,
separating each of the serial signals into the transmission signal and the amplitude signal;
spread modulating each of the transmission signals after the separation with a corresponding spread code; and
changing the spread modulated signals to have amplitudes indicated by the respective amplitude signals and then combining the changed signals into a combined spread signal;
wherein a signal format of the serial signal is such that the transmission signal is first transmitted, then a dummy bit is transmitted, and then the amplitude signal is transmitted.

10. A method for transmitting a serial signal in a CDMA base station transmitter, comprising the steps of:
converting amplitude signals and transmission signals into a plurality of first serial signals for respective communication channels, the amplitude signal being generated on a basis of an amplitude controlling signal included in a received signal from a mobile station and directing whether an amplitude of a signal to be transmitted from a base station is increased or decreased, and the transmission signal representing information to be transmitted to the mobile station,
performing time division multiplexing of the first serial signals to generate a second serial signal;
demultiplexing the second serial signal to reconstruct the respective first serial signals;
separating each of the reconstructed first serial signals into the transmission signal and the amplitude signal;
spread modulating each of the separated transmission signals with a corresponding spread code; and
changing the spread modulated signals to have amplitudes indicated by the respective amplitude signals and then combining the changed signals into a combined spread signal,
wherein a signal format of the second serial signal is such that a transmission signal for each communication channel is first transmitted and then an amplitude signal for each communication channel is transmitted.

11. A method for transmitting a serial signal in a CDMA base station transmitter, comprising:
converting amplitude signals and transmission signals into a plurality of first serial signals for respective communication channels, the amplitude signal being generated on a basis of an amplitude controlling signal included in a received signal from a mobile station and directing whether an amplitude of a signal to be transmitted from a base station is increased or decreased, and the transmission signal representing information to be transmitted to the mobile station,
performing time division multiplexing of the first serial signals to generate a second serial signal;
demultiplexing the second serial signal to reconstruct the respective first serial signals;
separating each of the reconstructed first serial signals into the transmission signal and the amplitude signal;
spread modulating each of the separated transmission signals with a corresponding spread code; and
changing the spread modulated signals to have amplitudes indicated by the respective amplitude signals and then combining the changed signals into a combined spread signal,
a signal format of the second serial signal is such that a transmission signal for each communication channel is first transmitted, a dummy bit is transmitted next, and finally an amplitude signal for each communication channel is transmitted.

12. A CDMA base station transmitter comprising:
a channel signal time division multiplexer configured to convert an amplitude signal and a transmission signal into a first serial signal, to output the first serial signal, the amplitude signal being generated on a basis of an amplitude controlling signal included in a received signal from a mobile station and directing whether an amplitude of a signal to be transmitted from a base station is increased or decreased, and the transmission signal representing information to be transmitted to the mobile station, and time division multiplexer configured to perform time division multiplexing of the first serial signals into a second serial signal, and to output the second serial signal; and a spreading and combining unit, including channel block separator configured to separate a serial signal into a first serial signal before the time division multiplexing, serial-to-parallel converter configured to separate the first serial signal from each of said channel signal processors into the transmission signal and the amplitude signal, a spread modulator configured to spread modulate each of the transmission signals from the serial-to-parallel converters with a corresponding spread code, and a combining circuit configured to change the signals spread modulated at said spread modulator to have amplitudes indicated by the respective amplitude signals, and then to combine the changed signals into a combined spread signal, wherein a signal format of the second serial signal is such that a transmission signal for each communication channel is first transmitted, and finally an amplitude signal for each communication channel is transmitted.

13. The CDMA base station transmitter according to claim 12, wherein in a format of the second serial signal, a dummy bit is transmitted before the amplitude signal.

* * * * *